Oct. 14, 1924.

R. A. HOLLAND

TREATMENT OF TIN PLATE SCRAP

Filed Oct. 12, 1921

1,511,967

Inventor
ROY ALGERNON HOLLAND

Attorney

Patented Oct. 14, 1924.

1,511,967

UNITED STATES PATENT OFFICE.

ROY ALGERNON HOLLAND, OF COBURG, VICTORIA, AUSTRALIA.

TREATMENT OF TIN-PLATE SCRAP.

Application filed October 12, 1921. Serial No. 507,330.

*To all whom it may concern:*

Be it known that I, ROY ALGERNON HOLLAND, residing at 40 Louisa Street, Coburg, in the State of Victoria, Commonwealth of Australia, have invented certain new and useful Improvements in the Treatment of Tin-Plate Scrap; and I do hereby declare the following to be a full, clear, and exact description of the invention, such as will enable others skilled in the art to which it appertains to make and use the same.

This invention relates to a process of detinning tin plate and refers especially to a process for the removal and recovery of tin from tin plate scrap obtainable from canneries and other manufactories. The iron or steel from which the tin has been removed is suitable for remanufacture as required.

Hitherto the usual method of treatment for the recovery of tin from tin-plate scrap has been to employ electrolysis in a solution of caustic soda with cathodes of iron or the like the anode being the tin-plate scrap usually packed in iron baskets.

The object of this invention is to provide a process of or method of treatment whereby the tin associated with iron in tin-plate scrap is removed therefrom and a solution obtained thereof without the employment of an electric current from an extraneous source, and the subsequent recovery of the tin from the solution in metallic form.

Our process or method of treatment is based on the electro-chemical fact, that when dissimilar metals are placed in contact in the presence of a suitable electrolyte, galvanic currents are set up which pass from the electro-positive metal through the electrolyte to the electro-negative metal, and back through the latter to the former. This action occurs whether the metals are in actual contact or connected by a conductor, or whether they are partly or wholly immersed in the electrolyte.

It is well known that the metallic elements may be arranged in an electromotive series according to their electro-positive powers or positivity. In this series the metals are set down in descending order so that each metal is electro-positive to those succeeding it and electro-negative to those preceding it. Metals occupying higher positions will go into solution in solutions of those lower in the series and will displace the latter and precipitate them. Moreover a metal will evolve cations or anions according as it is immersed in a solution of a metal situated respectively higher or lower in the electromotive series. Furthermore the magnitude of the E.M.F. is greater and the rate of solution faster the farther apart the selected metals are situated in the series.

In the course of our investigations, we have discovered that if tin-plate be arranged in contact with a metal situated lower in the electromotive series than iron and tin, and if the tin-plate and said metal be immersed in an electrolyte consisting of a solution of caustic soda, a hydroxide of a metal situated higher in said series than either; the tin will go into solution and the iron will remain unaffected. We preferably employ copper as the electronegative metal on account of its convenience and cheapness, either alone or in association with an oxidizing agent such as copper oxide or the like.

In practice we form a galvanic cell or element having the tin plate as anode, the copper as cathode, and the caustic soda solution as electrolyte. In lieu of using a cathode of copper we may use one made of carbon suitably impregnated with an oxidizing agent as copper oxide. Upon the immersion of the tin plate and the copper in the electrolyte an E.M.F. is set up, and when the tin plate and copper are short circuited by contact a current flows from the tin plate through the caustic soda solution to the copper, and back through the copper to the tin plate.

If a metal goes into solution in an electrolyte and another metal is not thrown down, it is well known that hydrogen is liberated at the cathode, and oxygen, or the combining radicle of the electrolyte at the anode.

In this galvanic element hydroxyl ions are liberated at the anode, and sodium ions are evolved at the cathode. The hydroxyl ions attack the tin coating of the tin-plate and a primary reaction occurs in which hydroxide of tin, an unstable compound is formed. A secondary reaction thereafter occurs in which the hydroxide of tin is acted upon by the caustic soda solution to form sodium stannite which passes into solution.

At the cathode the sodium ions decompose the solvent, water, free hydrogen being thereby liberated.

The liberation of free hydrogen at the copper-plate or cathode lessens the active surface thereof and polarizes it, thereby setting up an opposing or back E.M.F. which hinders the galvanic action. To obviate this we employ copper oxide as a depolarizer, which is reduced by the hydrogen ions or hydrions; atomized copper being formed.

At the completion of the galvanic action the iron plate will be found to have been freed of its coating of tin and after being drained and washed is ready for remanufacture as required.

The tin having gone into solution can be obtained in the metallic form by electrolysis. For this purpose suitable electrodes of iron or steel are introduced into the solution. These electrodes are arranged to form the cathode while the said copper plate constitutes the anode. Upon passage of an electric current through the solution metallic tin is deposited upon the cathode and caustic soda and copper oxide are regenerated and are ready for re-use.

It will be obvious to persons skilled in the art of electro-chemistry that in practice to carry out the process, apparatus can be arranged in a number of ways. For simplicity and convenience the copper-plate or cathode of our galvanic element can be constructed as a vat or container for the electrolyte. The tin-plate scrap is placed on the bottom of this vat and is immersed in the electrolyte. Means are provided for holding the depolarizing agent and also for conveniently handling the tin-plate scrap.

In order that the arrangement of apparatus for efficiently carrying out our process may be readily understood two constructions are illustrated in the accompanying drawings by way of example.

Referring now to the drawings:—

In these drawings the numeral 1 designates a vat or container which is constructed with an outer casing 2 of iron or other suitable material and a lining of copper sheeting 3 or the vat may be made entirely of copper if preferred.

Figure 1:
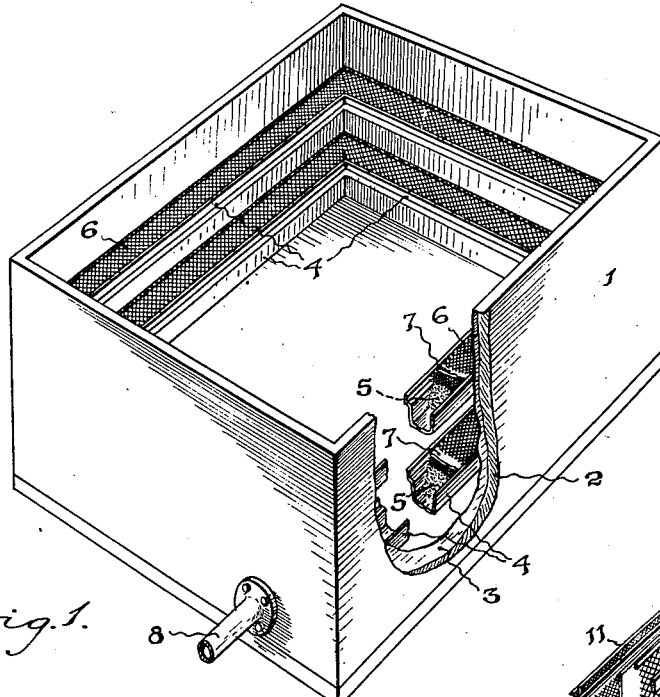
Figure 1 is a view in perspective of a vat having a copper lining and laterally disposed troughs accommodating a depolarizing agent.

In the construction shewn in Figure 1, copper troughs 4 are fixed in any approved way to the sides of the vat 1. These troughs 4 are packed with copper oxide 5 and are furnished with wire mesh covers 6 below which porous septa 7 as asbestos sheeting may be placed, if required. The meshed covers 6 and porous septa 7 while permitting the electrolytic solution of caustic soda to penetrate freely to the copper oxide, also serve to retain the same within the troughs 4.

In use tin-plate scrap is placed upon the copper-lined bottom of the vat 1 and is submerged beneath the caustic soda solution contained therein. The tin plate being in contact with the copper-lining, galvanic action is set up and the tin coating goes into solution as sodium stannite, the copper oxide in the troughs 4 being at the same time reduced to metallic copper in the manner above described.

At the completion of the galvanic action the residual iron scrap is removed and the tin is recovered electrolytically. For the latter purpose electrodes of iron may be placed in the solution in the vat 1. Current is furnished from an outside source to the copper lining, which forms the anode, and passes through the solution to the iron electrodes which constitute the cathode. Metallic tin is deposited upon the latter which thereafter is removed and melted down and cast into ingots. Synchronously with the electro-deposition of the tin the atomized copper in the troughs 4 is re-oxidized to form copper oxide, and cautic soda is regenerated. It will be readily understood that the process is cyclic, all chemical energy being regenerated and the only consumption of energy being that required for the deposition of the tin.

A draw-off pipe 8 can be fitted to the vat 1 through which the tin-bearing solution may be run off if required. After the treatment of a quantity of tin-plate scrap and in order to facilitate the process the tin-bearing solution may be run off and electrolized in a separate vessel. Upon extraction of the tin-bearing solution the vat 1 can be refilled with caustic soda solution and a fresh quantity of tin-plate treated.

In order to facilitate handling, the tin-plate scrap may be placed in a receptacle such as a wire mesh basket 9 constructed to fit freely in the vat 1 and provided with handles 10 for lifting purposes.

In this basket is placed an electrode 11 comprising an inner core consisting of a series of fluted or V-shaped strips 12 of metallic copper having sheets 13 of porous material, as asbestos, on opposite sides thereof and coverings 14 of wire mesh or the like. Rivets 15 or like attachment means can be employed to fix the strips 12 to the sheets 13. Cleats 16 and bolts 17 passed therethrough are employed to securely hold together the component parts of the electrode 11.

The spaces between the copper strips 12 and the asbestos sheets 13 are filled with copper oxide which constitutes the depolarizing agent already described. Bars of iron or other preferred material can be used if required as a protective covering for the edges of the porous sheets 13 and outer coverings 14, and to prevent displacement of the strips 12 and dislodgement of the copper oxide.

A single corrugated copper sheet likewise secured by rivets or the like to the asbestos sheets 13 can be used if preferred in lieu of said copper strips 12.

Figure 4:
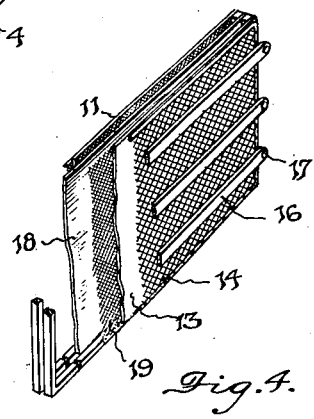
Figure 4 is a sectional perspective view of a modified form of electrode.
Figure 2:
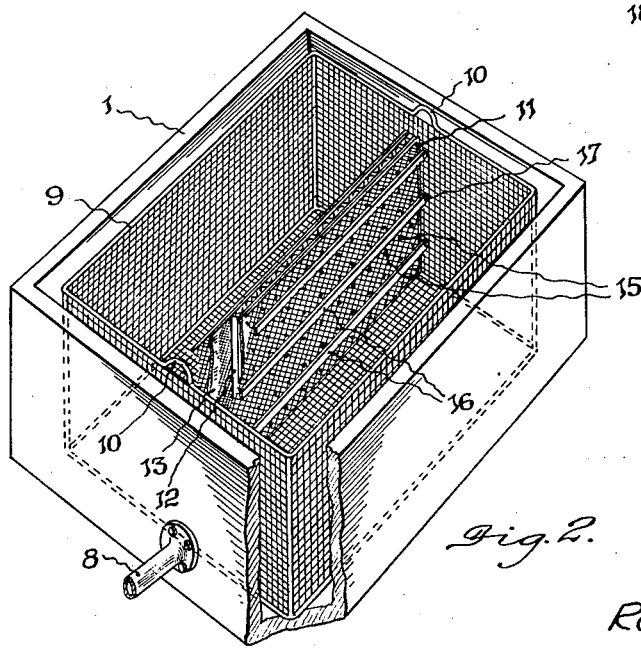
Figure 2 is a view in perspective of a vat provided with a dipping basket and electrode of special construction.
Figure 3:
Figure 3 is a sectional plan view of portion of the electrode shewn in Figure 2.

In the modified electrode shewn in Figure 4 a flat copper plate 18 is employed on each side of which is arranged an inner wire mesh or netting 19 to hold the depolarizer in position. This copper plate 18 and wire mesh 19 are covered with porous sheets 13 and outer wire mesh coverings 14 and are assembled and fixed together in the manner above described.

In operation an electrode made as described is preferably located in a central position in the vat 1 and the spaces on opposite sides thereof serve to accommodate the tin-plate. The basket 9 containing tin-plate scrap and the centrally disposed electrode is placed in the vat 1 which is filled with sufficient caustic soda solution to cover the tin-plate scrap.

Upon contact of the tin-plate with the outer coverings 14 and the heads of the rivets 15 galvanic action is set up and the tin goes into solution in the manner above described. On completion of the action the basket 9 is withdrawn and the electrode 11 in which the copper oxide is partly or wholly reduced is taken out and placed in an electrolyzing vat.

The solution of sodium stannite is run through the draw-off 8 into this electrolyzing vat into which are also put one or more electrodes of iron. These iron electrodes are used as the cathode while the electrode 11 forms the anode. Upon passing a current through the vat metallic tin is deposited on the iron cathode and the atomized copper in the electrode 11 is re-oxidized to form copper oxide in the manner previously described. The electrode at the completion of this electrolytic process is ready for use with a fresh quantity of tin-plate scrap as and when required.

In the foregoing it has been stated that copper oxide, forming the depolarizing agent, is reduced in the primary galvanic action and that the atomized copper thereby formed is re-oxidized in the secondary electrolytic action. However, if preferred, the atomized copper, at the end of the galvanic action, can be removed from the cathode and treated separately to undergo re-oxidation.

For this purpose the atomized copper moistened with caustic soda solution may be conveniently placed upon trays, or the like, and covered with a sheet of pervious material allowing access of air; when oxidation of the copper takes place spontaneously.

In this manner the atomized copper is oxidized and is converted into copper oxide ready for use in the treatment of a further quantity of tin-plate scrap.

I claim:—

1. A process of detinning tin plate scrap consisting in immersing the tin plate scrap in an electrolyte in direct electrical contact with a metal negative to iron and tin in association with a depolarizing substance whereby galvanic action is set up resulting in the removal of the metallic tin from the scrap.

2. A process of detinning tin plate scrap consisting of immersing the tin plate scrap in an electrolyte of caustic soda in electrical contact with a metal electro-negative to tin and iron in association with depolarizing copper oxide whereby galvanic action is set up resulting in the formation of a soluble salt of tin.

3. In a process as claimed in claim 1 characterized by the fact that the electrolyte consists of a solution of hydroxide of alkali metal.

4. In a process as claimed in claim 1 characterized by the fact that the cathode of the galvanic cell consists of copper.

5. In a process as claimed in claim 1 characterized by the fact that the depolarizing agent consists of copper oxide.

6. In an apparatus for the detinning of tin scrap, a galvanic cell comprising a vat, having a basket or container for the said tin scrap provided with an electrode consisting of a metal electro-negative to tin and iron having a packing on both sides of a layer of depolarizing agent.

In testimony whereof I affix my signature.

ROY ALGERNON HOLLAND.

Witnesses:
WILLIAM A. ASHTON,
G. R. CULBERY.